US012674475B2

(12) United States Patent

Barbier et al.

(10) Patent No.: US 12,674,475 B2

(45) Date of Patent: Jul. 7, 2026

(54) PROTECTION FOR A CIRCUIT FOR CONTROLLING THE ORIENTATION OF PROPELLER BLADES OF AN AIRCRAFT ENGINE

(71) Applicant: SAFRAN AIRCRAFT ENGINES, Paris (FR)

(72) Inventors: Hugues Barbier, Moissy-Cramayel (FR); Sébastien Oriol, Moissy-Cramayel (FR); Kevin Didier Pierre Le Normand, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/992,046

(22) PCT Filed: Jul. 6, 2023

(86) PCT No.: PCT/FR2023/051042
§ 371 (c)(1),
(2) Date: Jan. 7, 2025

(87) PCT Pub. No.: WO2024/009044
PCT Pub. Date: Jan. 22, 2024

(65) Prior Publication Data
US 2026/0016026 A1     Jan. 15, 2026

(30) Foreign Application Priority Data
Jul. 8, 2022     (FR) ...................................... 2207025

(51) Int. Cl.
*F15B 11/08* (2006.01)
*B64C 11/38* (2006.01)
(Continued)

(52) U.S. Cl.
CPC .............. *F15B 11/08* (2013.01); *B64C 11/38* (2013.01); *F02K 1/66* (2013.01); *F02K 1/763* (2013.01);
(Continued)

(58) Field of Classification Search
CPC ...... F15B 11/08; F15B 20/002; F15B 20/004; F15B 2211/30525; F15B 2211/30565;
(Continued)

(56) References Cited

U.S. PATENT DOCUMENTS 8,517,335 B2 * 8/2013 Tondolo ................ F15B 20/002
                                                          60/404
9,250,632 B2 * 2/2016 Tondolo ............... G05D 7/0617
(Continued)

FOREIGN PATENT DOCUMENTS

EP     1178223 A2     2/2002
EP     2192307 A2     6/2010
(Continued)

OTHER PUBLICATIONS

Search Report for International Application PCT/FR2023/051042 issued on Sep. 15, 2023.

*Primary Examiner* — Dustin T Nguyen
(74) *Attorney, Agent, or Firm* — McDonald Hopkins LLC

(57) ABSTRACT

A hydraulic control circuit of a steering actuator having a first and a second chamber, for orienting the blades of an aircraft engine propeller, this circuit comprising a high-pressure line and a low-pressure line, a first protection valve being able to assume a deactivated position or an activated position for placing the first chamber in communication with the high-pressure line, a second protection valve being able to assume a deactivated position or an activated position for placing the second chamber in communication with the low-pressure line, each protection valve comprising a (Continued)

hydraulic activation inlet and a hydraulic deactivation inlet which can be pressurised in order to activate or deactivate these valves. The circuit includes a solenoid protection valve controlling an amplification valve connected to the inlets of the protection valves in order to activate them upon the activation of the solenoid protection valve.

6 Claims, 3 Drawing Sheets

(51) Int. Cl.

| | | |
|---|---|---|
| *F02K 1/66* | (2006.01) | |
| *F02K 1/76* | (2006.01) | |
| *F15B 20/00* | (2006.01) | |
| *B64C 11/30* | (2006.01) | |

(52) U.S. Cl.
CPC ............ *F02K 1/766* (2013.01); *F15B 20/002* (2013.01); *F15B 20/004* (2013.01); *B64C 11/30* (2013.01); *F05D 2220/323* (2013.01); *F05D 2260/74* (2013.01); *F15B 2211/30525* (2013.01); *F15B 2211/30565* (2013.01); *F15B 2211/329* (2013.01); *F15B 2211/6316* (2013.01); *F15B 2211/862* (2013.01); *F15B 2211/863* (2013.01); *F15B 2211/8636* (2013.01); *F15B 2211/8752* (2013.01); *F15B 2211/8757* (2013.01)

(58) Field of Classification Search
CPC ........ F15B 2211/329; F15B 2211/6316; F15B 2211/862; F15B 2211/863; F15B 2211/8636; F15B 2211/8752; F15B 2211/8757; B64C 11/38; B64C 11/30; F02K 1/763; F02K 1/766; F05D 2220/323; F05D 2260/74
See application file for complete search history.

(56) References Cited

U.S. PATENT DOCUMENTS

| | | | | |
|---|---|---|---|---|
| 10,273,988 | B2 * | 4/2019 | Kondo | .................. F15B 11/044 |
| 10,577,080 | B2 * | 3/2020 | Maver | ................... F15B 20/008 |
| 11,268,542 | B2 * | 3/2022 | Medina | ................ B64C 13/504 |
| 11,649,610 | B2 * | 5/2023 | Kondo | .................. E02F 9/2282 60/486 |

FOREIGN PATENT DOCUMENTS

| | | | |
|---|---|---|---|
| EP | | 3447315 A1 | 2/2019 |
| FR | | 2985284 A1 | 7/2013 |

* cited by examiner

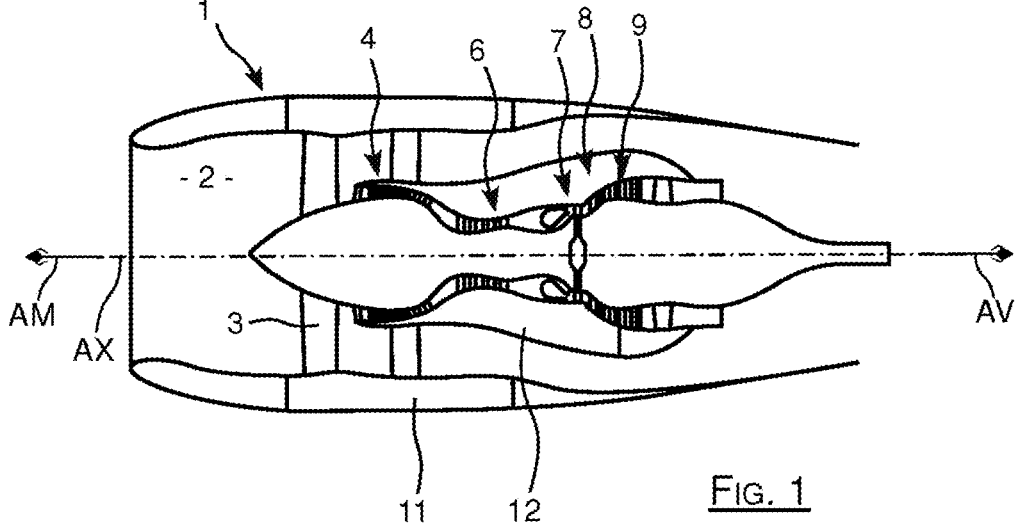
FIG. 1
FIG. 2
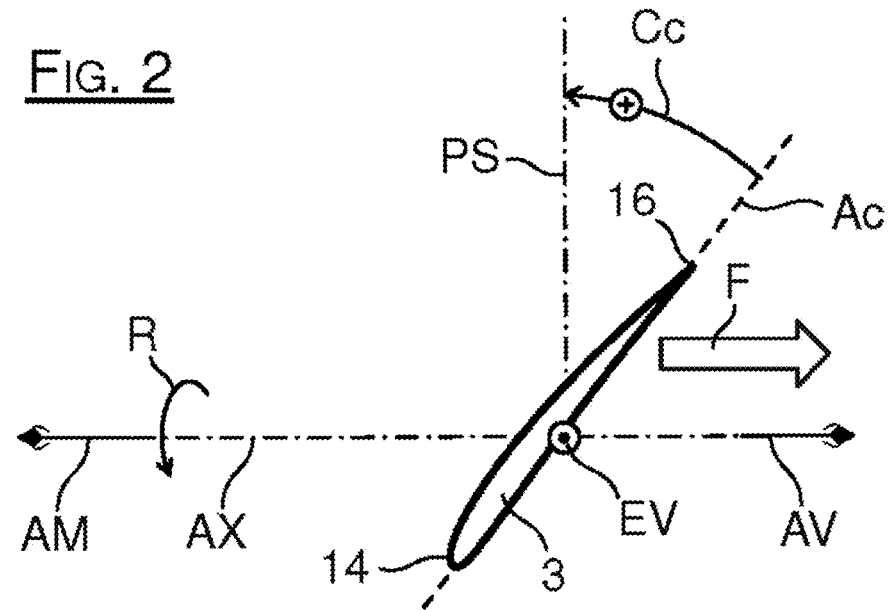

PROTECTION FOR A CIRCUIT FOR CONTROLLING THE ORIENTATION OF PROPELLER BLADES OF AN AIRCRAFT ENGINE

CROSS-REFERENCE TO RELATED APPLICATION

This application is a 35 U.S.C. § 371 national stage application of PCT Application No. PCT/FR2023/051042 on Jul. 6, 2023," which claims priority to French Patent Application No. FR2207025 filed on Jul. 8, 2022, each of which are incorporated herein in their entirety by reference.

TECHNICAL FIELD

The invention relates to an aircraft engine including variable-pitch blades for controlling and/or reversing the thrust generated by this engine, and the object thereof is to provide protection to prevent, in the event of a failure of the control system, accidental thrust reversal when the aircraft is in flight.

PRIOR ART

In an aircraft engine of the turbojet type, air is admitted into an inlet duct to pass through a pusher propeller including a series of rotary blades before splitting into a central primary flow and a secondary flow surrounding the primary flow.

The primary flow is then compressed in compression stages before reaching a combustion chamber, after which it is expanded through high-pressure and low-pressure turbines before being discharged to the rear. The secondary flow for its part is propelled directly downstream by the pusher propeller into a duct delimited externally by an engine fairing. Such an engine includes a low-pressure spool by means of which the pusher propeller is coupled to the low-pressure turbine, and a high-pressure spool by means of which the high-pressure compressor is coupled to the high-pressure turbine, these two spools being coaxial and rotationally independent.

The thrust reversal of such an engine can be ensured by providing variable-pitch propeller blades, that is to say whose orientation about the spanning axis thereof, which extends radially with respect to the axis of rotation of the engine, can be modified in flight.

In this case, the blades may assume a propulsion orientation so that the engine generates a thrust directed towards the downstream direction thereof, and an orientation called thrust reversal, wherein it generates thrust directed towards the upstream direction thereof, the latter being intended to be used only when the aircraft is on the ground to decelerate the aircraft.

In practice, propulsion orientations are commonly referred to as coarse pitches, and thrust reversal orientations are commonly referred to as fine pitches.

The transition from propulsion orientation to thrust reversal orientation is typically carried out by a rotation of the blades in the order of 90°, the orientation control generally being provided by a hydraulic circuit.

However, a plurality of failures can lead to a drift of the flight pitch towards the thrust reversal position. This may be a failure of the pitch control component, i.e. a computer controlling the hydraulic circuit, or a failure of the hydraulic circuit per se.

In this context, a protection system integrated into the hydraulic circuit ensures that the blades cannot change to the thrust reversal orientation when the aircraft is, for example, in cruise flight, such protections being described in patent documents FR2981684A1, FR2978953A1, FR2985284A1 and FR3014153A1.

Thus, when it is detected that the blades are or are approaching a thrust reversal orientation while the engine is in the flight configuration, the protection is actuated to act on the hydraulic circuit so that it returns to a propulsion orientation.

In general, this type of protection can be implemented in a non-ducted turboprop or open rotor engine with contra-rotating double-propeller, or in a ducted engine such as a turbojet engine having variable-pitch fan blades.

In practice, it appears that the reaction time of the existing protections is in the order of one second, between the instant when they are controlled and the instant when the blades effectively begin to be brought back to a propulsion orientation.

The aim of the invention is to provide a solution to improve the reactivity of such a protection.

DESCRIPTION OF THE INVENTION

To this end, the object of the invention is a hydraulic control circuit for actuating a double-acting steering actuator to orient the blades of an aircraft engine pusher propeller, this double-acting actuator comprising a first and a second chamber, this circuit comprising:

a high-pressure line and a low-pressure line;

a distributing valve for connecting the first chamber to the high-pressure line and to the second chamber to the low-pressure line or vice versa, or for isolating the two chambers from the high-pressure and low-pressure lines;

a first protection valve being able to assume a deactivated position or an activation position wherein it places the first chamber in communication with the high-pressure line;

a second protection valve being able to assume a deactivated position or an activation position wherein it places the second chamber in communication with the low-pressure line;

characterised in that:

these protection valves include an activation hydraulic inlet and a deactivation hydraulic inlet that can be connected to the high-pressure line or to the low-pressure line to place them in the deactivation or activation position;

an amplification valve being able to assume a deactivated position or an activation position wherein it connects the high-pressure line to each activation inlet and the low-pressure line to each deactivation inlet to activate the protection valves;

the amplification valve including a hydraulic control inlet for placing it in the activation position when this control inlet is connected to the low-pressure line, and for placing it in the deactivated position when this control inlet (46) is connected to the high-pressure line;

and a protection solenoid valve being able to assume a deactivation position or an activation position wherein it connects the control inlet of the amplification valve to the low-pressure line in order to activate it.

With this solution, the amplification valve makes it possible to hydraulically control the protection valves so that they quickly change position under the effect of the pressurisation of the activation inlets thereof.

The invention also relates to a circuit thus defined, wherein the first and the second protection valve are mechanically coupled and share the same activation hydraulic inlet and the same deactivation hydraulic inlet.

The invention also relates to a circuit thus defined, wherein the first and the second protection valve each include a slide valve, and wherein these two slide valves are connected to one another by a rod.

The invention also relates to a circuit thus defined, wherein each protection valve is equipped with a return spring tending continuously to return it to the activation position thereof.

The invention also relates to a circuit thus defined, wherein the amplification valve is equipped with a return spring tending continuously to return it to the activation position thereof.

The invention also relates to a circuit thus defined, wherein the protection valves isolate the first chamber and the second chamber from the distributing valve when they are activated.

The invention also relates to an aircraft engine including a circuit thus defined.

BRIEF DESCRIPTION OF THE DRAWINGS

FIG. 1 is a longitudinal sectional view of a bypass turbojet engine;

FIG. 2 is a view along the spanning axis of a pusher propeller blade having a propulsion orientation;

DETAILED DESCRIPTION OF SPECIFIC EMBODIMENTS

Figure 3:
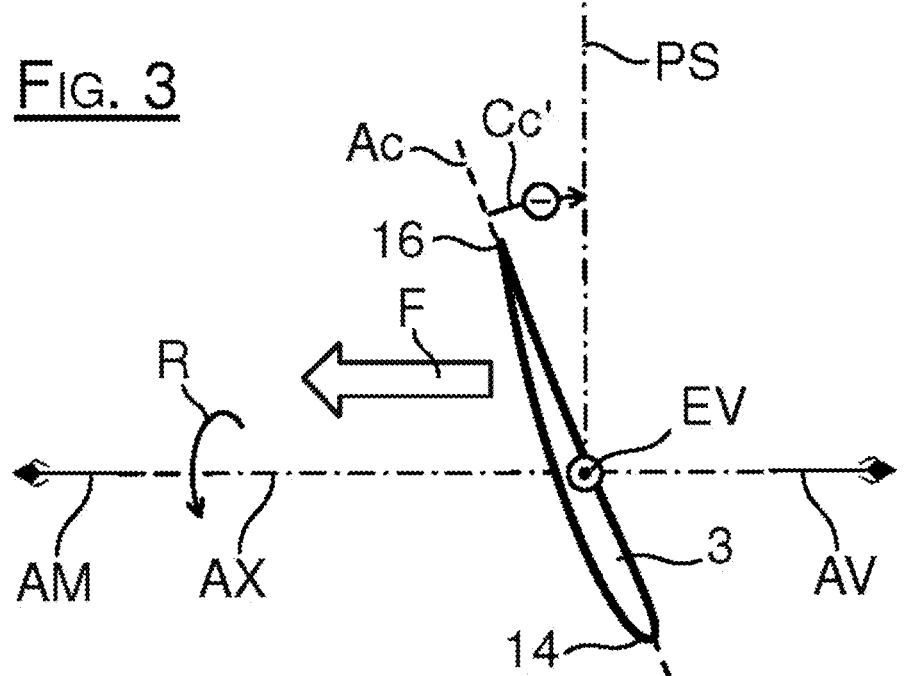
FIG. 3 is a view along the spanning axis of a pusher propeller blade having a thrust reversal orientation.

In an aircraft engine such as the engine marked by 1 in FIG. 1, air is admitted into an inlet duct 2 located upstream AM to pass through the blades 3 of a pusher propeller, also called fan, including a series of rotary blades, before splitting into a central primary flow and a secondary flow surrounding the primary flow. These two flows circulate in the engine in the longitudinal direction AX thereof, from the upstream AM to the downstream AV of this engine when it generates a propulsion thrust.

The primary flow is admitted into an air intake 4 located downstream of the pusher propeller and extending about the longitudinal axis AX, to be then compressed in low-pressure compressors 5 and high-pressure compressors 6 before arriving in a combustion chamber 7. This primary flow is then expanded through a high-pressure turbine 8 and a low-pressure turbine 9 before being discharged downstream. The secondary flow for its part is propelled directly downstream by the pusher propeller into a duct delimited externally by a nacelle 11 carrying the entire engine.

Such a twin-spool engine includes a low-pressure spool by means of which the pusher propeller is coupled to the low-pressure turbine 9, and a high-pressure spool by means of which the high-pressure compressor 6 is coupled to the high-pressure turbine 8, these two spools being coaxial and rotationally independent. These spools are surrounded by a set of casings 12 running along the longitudinal axis that they surround.

In FIG. 3, a variable-pitch pusher propeller blade 3 includes a pressure face and a suction face extending between a leading edge 14 and a trailing edge 16. This blade 3 extends along a so-called spanning axis EV radial with respect to the axis AX, from a foot by which it is rigidly secured to a rotor element not shown, up to a tip corresponding to the free end thereof that is opposite the internal face of the nacelle 11.

The pitch angle of the blade is the angle between the chord axis AC, which passes through the leading edge 14 and the trailing edge 16 and extends in a plane normal to the axis EV, and the plane PS of the propeller that is normal to the axis AX. In the following, when such a pitch angle has a positive value, it corresponds to a downstream propulsion of the air flow wherein the rotating blade is immersed, that is to say a propulsion direction. A negative value corresponds to a propulsion of the air flow upstream.

In FIG. 3, the blade 3 assumes a propulsion orientation, corresponding for example to a so-called cruising speed: the chord axis AC is inclined by a positive pitch angle CC with respect to the plane PS.

In the configuration corresponding to a propulsion orientation of FIG. 3, the pitch angle of the blade 13 is positive, so that, by being driven in rotation in the direction marked by R in the figures, it propels the air flow from upstream AM to downstream AV. The direction of rotation R corresponds to the clockwise direction when looking at the propeller along the axis AX, from the front, that is to say from the upstream AM thereof.

This blade is of the variable-pitch type: the orientation thereof about the axis EV is adjustable according to the operating conditions of the engine. In the situation of FIG. 3, the orientation of the blade 13 corresponds to a propulsion operation of the engine, that is to say wherein the flow F passing through the engine is propelled upstream AM to downstream AV.

In the thrust reversal phase, for example when the aircraft lands and the engine is operated to brake the aircraft, the propeller blades are controlled to change the orientations thereof. They then pivot about the spanning axes thereof in order to change from the propulsion orientation corresponding to FIG. 3, to the thrust reversal orientation corresponding to the situation shown in FIG. 4.

In the example in FIGS. 2 and 3, the blade pivots in the direct direction to change from the propulsion orientation to the thrust reversal orientation, so that the leading edge thereof is downstream from the trailing edge thereof to the thrust reversal orientation. When changing from one orientation to the other, the blade passes through a transient position known as 0° wherein the chord axis thereof passes through the plane PS of the propeller. It is important that the blade remains in this transient position for a short time because it is likely to generate an overspeed of the engine.

It is also possible to provide a different configuration, wherein the blade rotates in the opposite direction to change from the propulsion orientation to the thrust reversal orientation, the trailing edge thereof then remaining upstream of the leading edge thereof when it is in the thrust reversal orientation. When passing from one orientation to the other, the blade passes through a so-called flag position in which the chord axis thereof is parallel to the axis AX.

Figure 4:
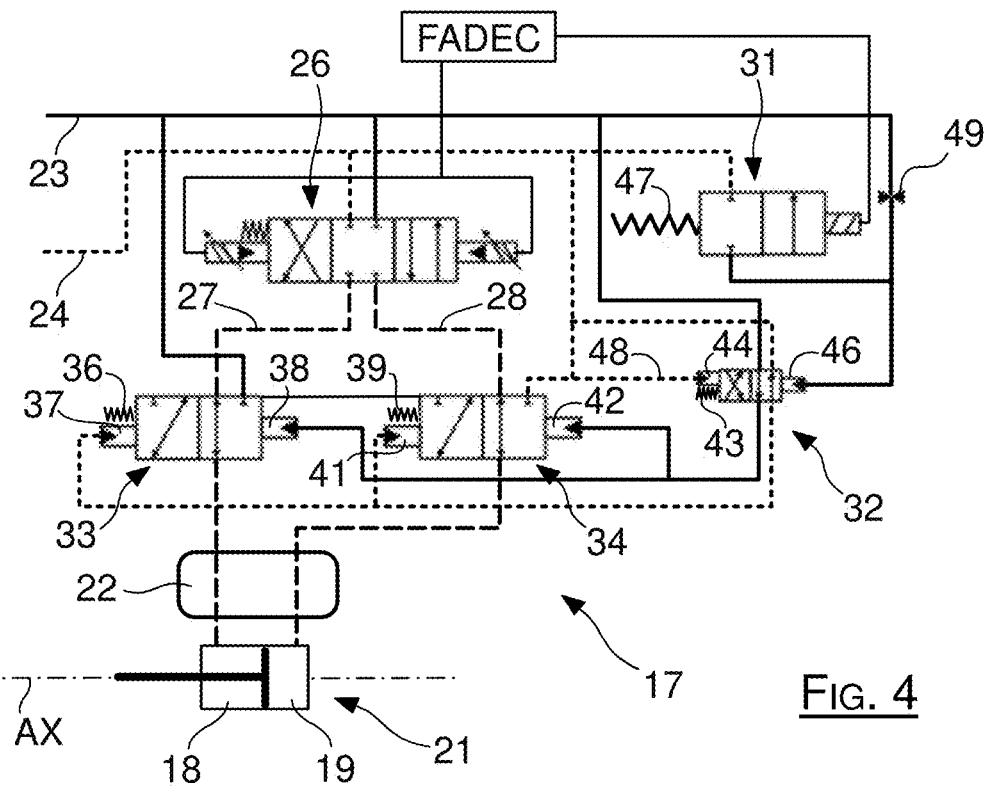
FIG. 4 is a schematic view of the control circuit according to the invention in nominal operation.

In FIG. 4, a hydraulic circuit 17 ensures the pressurisation of a first upstream chamber 18 or of a second downstream chamber 19 of a double-acting steering actuator 21 acting on the longitudinal position of a central shaft of an engine. This makes it possible to maintain the blades of the propeller at a predetermined pitch angle by maintaining this shaft at a given position and changing the pitch angle of these blades by moving this shaft.

This actuator 21 is carried by the central shaft which rotates while being powered by the control circuit which is carried by fixed elements of the motor, thanks to a hydraulic transfer bearing 22 surrounding the central shaft, this bearing being the seat of hydraulic leaks. This circuit 17 includes a high-pressure feed line 23 supplied by a pump not shown, and a low-pressure return line 24 opening into a reservoir not shown.

The feed 23 and return 24 lines are connected to the actuator 21 by means of a three-position distributing valve 26, comprising a central neutral position corresponding to that which it assumes in FIG. 4, as well as a pitch increase position and a pitch decrease position.

This distributing valve 26, which is here a slide valve, is connected to the upstream chamber 18 by an upstream line 27 and by the bearing 22, and it is connected to the downstream chamber 19 by a downstream line 28 and by the bearing 22.

In the neutral position of FIG. 4, the lines 23 and 24 are isolated from the chambers 18 and 19, which are at pressures of intermediate value between the high pressure and the low pressure, the blades 3 of the propeller therefore having the angle of orientation thereof immobilised at a fixed value.

When the distributing valve 26, which is here a slide valve, is placed in the pitch increase position thereof, that is to say offset to the right with respect to the position thereof in FIG. 4, the distributing valve places the upstream chamber 18 in communication with the high-pressure feed line 23, and the downstream chamber 19 in communication with the low-pressure return line 24. This has the effect of moving the rod of the actuator 21 to the right in FIG. 4, to increase the pitch angle CC of the blades 3 in order to place them in a propulsion orientation.

Figure 5:
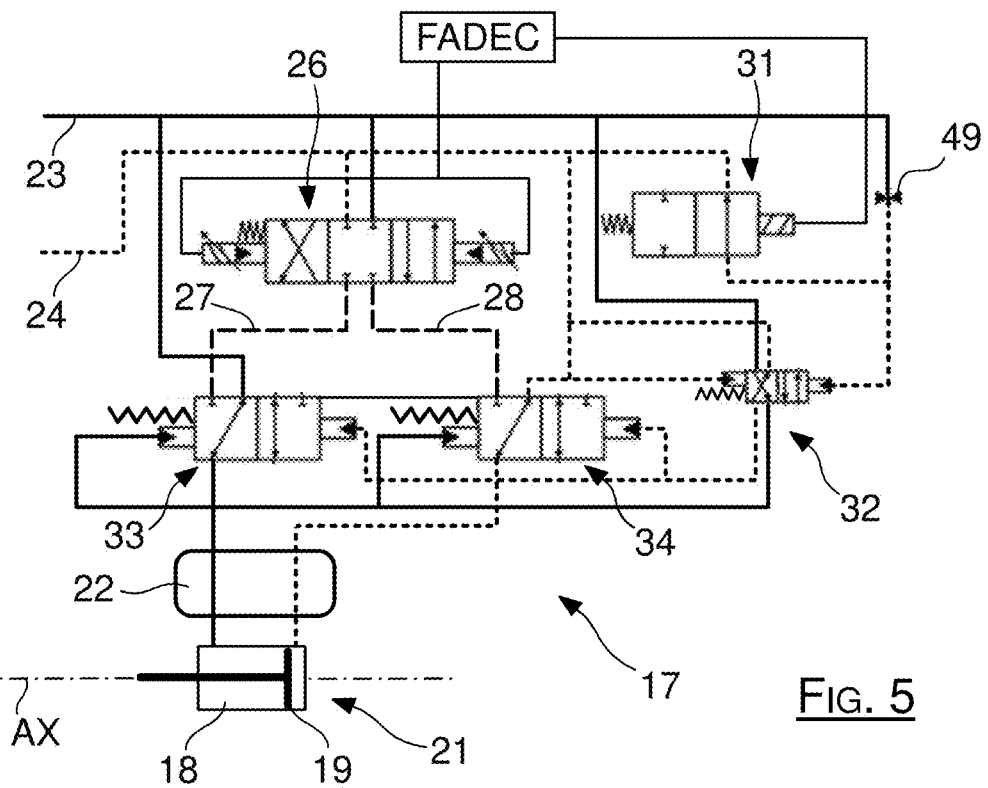
FIG. 5 is a schematic view of the control circuit according to the invention when the protection system thereof is activated.

When the distributing valve 26 is in the pitch reduction position thereof as shown in FIG. 5, that is to say offset to the left with respect to the position thereof in FIG. 4, it places the upstream chamber 18 in communication with the return line 24, and the downstream chamber 19 in communication with the high-pressure line 23. This has the effect of moving the rod of the actuator 21 to the left in FIG. 4 to decrease the angle CC at which the blades 3 are pitched in order to place them in a thrust reversal orientation.

The circuit 17 integrates a protection system 29 ensuring that the blades 3 cannot accidentally reach a thrust reversal orientation while the aircraft is in flight.

This protection system includes a protection solenoid valve 31, an amplification valve 32, as well as a first protection valve 33 and a second protection valve 34.

The protection valve 33 is here a two-position slide valve equipped with a return spring 36 and having an activation hydraulic inlet 37 located on the side of the spring 36, and a deactivation hydraulic inlet 38 located on the side opposite the spring 36.

When the activation inlet 37 is depressurised and the deactivation inlet 38 is pressurised, the slide is pushed by the deactivation inlet against the spring 36 to place the valve 33 in the deactivated position, as shown in FIG. 4. When the activation inlet 37 is pressurised and the deactivation inlet 38 is depressurised, the slide is pushed by pressurising the activation inlet to place the valve in the activated position as shown in FIG. 5.

In the deactivated position corresponding to FIG. 4, the valve 33 is simply passed through by the oil of the upstream line 27. In the activated position, as in FIG. 3, the valve 33 places the upstream chamber 18 directly in communication with the high-pressure line 23, while isolating this chamber 18 from the distributing valve 26.

The protection valve 34 is here a two-position slide valve equipped with a return spring 39 and having an activation hydraulic inlet 41 located on the side of the spring 39, and a deactivation hydraulic inlet 42 located on the side opposite the spring 39.

When the activation inlet 41 is depressurised and the deactivation inlet 42 is pressurised, the slide is pushed by the deactivation inlet against the spring 39 to place the valve 34 in the deactivated position, as shown in FIG. 3. When the activation inlet 41 is pressurised and the deactivation inlet 42 is depressurised, the slide is pushed by the activation inlet 41 to place the valve in the activated position, as shown in FIG. 4.

In the deactivated position corresponding to FIG. 4, the valve 34 is simply passed through by the oil of the downstream line 28. When it assumes the activated position thereof, as in FIG. 5, it places the downstream chamber 19 directly in communication with the low-pressure line 24, while isolating this chamber 19 from the distributing valve 26.

As will have been understood, when the two protection valves 33 and 34 are deactivated, the position of the actuator 21, and therefore the angle of the blades 3, is governed by the distributing valve 26, which makes it possible to increase or decrease the angle of these blades 3.

Conversely, when the two protection valves 33 and 34 are activated, the upstream chamber 18 is pressurised and the downstream chamber 19 is depressurised, which moves the rod of the actuator 21 to the right in the figures to bring the pitch angle of the blades 3 back to a propulsion orientation.

As can be seen in FIG. 4, the activation and deactivation inlets of the two valves 33 and 34 are supplied by the amplification valve 32, which is here a two-position slide valve. This slide valve comprises a return spring 43, a passive hydraulic inlet 44 located on the side of the spring 43, and a hydraulic control inlet 46 located on the side opposite the spring 43. The passive inlet 44 is continuously subjected to a low pressure because it is permanently connected to the low-pressure line 24.

In nominal operation corresponding to FIG. 4, the control inlet 46 of the valve 32 is pressurised, so that the slide of this valve 32 is pushed against the spring 43 by pressurising the control inlet 46 to place it in the inactivation position. In this position, the valve 32 connects the deactivation inlets 38 and 42 of the protection valves 33 and 34 to the high-pressure line 23 to pressurise them, and it connects the activation inlets 37 and 41 thereof to the low-pressure line 24 to depressurise them, so that the valves 33 and 34 are both in the deactivation positions thereof. The pitch angle of the blades 3 is therefore governed by the control of the distributing valve 26.

In protection operation corresponding to FIG. 5, the control inlet 46 is depressurised, as in the situation of FIG. 5, the slide of the valve 32 is pushed by the spring 43 to place it in the activation position. In this position, the valve 32 connects the deactivation inlets 38 and 42 of the protection valves 33 and 34 to the low-pressure line 24 to depressurise them, and it connects the activation inlets 37 and 41 thereof to the high-pressure line 23 to pressurise them, which places the valves 33 and 34 in the activation positions thereof. The pitch angle of the blades 3 is then automatically returned to a propulsion orientation, due to the fact of the pressurisation of the upstream chamber 18 and the depressurisation of the downstream chamber 19 generated by the activation of the protection valves 33 and 34. Alternatively, it is possible to dispense with the spring 43 by providing different sections for the hydraulic chambers connected respectively to the inlets 44 and 46. If the cross-section of the chamber connected to the passive inlet 44 is greater than that of the chamber connected to the control inlet 46 and these inlets 44 and 46 are subjected to the same pressure, the thrust of the first chamber is greater than that of the second chamber. The resulting thrust then moves the slide of the valve 32 to the activation position thereof. According to another alternative, a spring of high stiffness is provided, in order to dispense with the passive inlet 44 of the valve 32 and therefore also with the line part 48 connecting this passive inlet 44 to the low-pressure line 24. The stiffness of the spring is then sufficient to generate a force greater than the hydraulic thrust produced by the control inlet 46 when the latter is depressurised, that is to say when the pressure at this inlet 46 is less than a predetermined threshold. In this way, the forces of the spring counter the hydraulic thrust in the opposite direction to move the slide of the valve 32 to the activation position thereof. The stiffness of the spring is then chosen to generate a force less than the hydraulic thrust produced by the inlet 46 when the latter is pressurised by the high-pressure line 23. In this case, in nominal operation when the protection solenoid valve 31 is closed, pressurisation of the inlet 46 maintains the amplification valve 32 in the inactivation position thereof, the spring 43 then being compressed by the opposite hydraulic pressure.

The amplification valve 32 is controlled by the protection solenoid valve 31 which can assume an activated position, that is to say open as in FIG. 5, wherein it depressurises the control inlet 46 of the valve 32 by placing this inlet in communication with the low-pressure line 24. In nominal operation, the protection solenoid valve 31 assumes an inactivated position, that is to say closed, as in FIG. 4, which ensures that the inlet 46 of the amplification valve 32 is pressurized so that this valve 32 is in the inactivation position.

As can be seen in FIG. 5, the high-pressure line 23 is equipped with a diaphragm 49 which avoids short-circuiting the line 23 with the line 24 when they are connected to one another during the activation of the solenoid valve 31.

This protection solenoid valve 31 is controlled electrically by an engine computer, usually designated by the acronym FADEC (Full Authority Digital Engine Control) so as to be inactivated in nominal operation, and to be activated when the system detects that the blades 3 are in a thrust reversal orientation while the aircraft is in flight. As will be understood, this solenoid valve 31 is, for example, a slide valve equipped with a solenoid making it possible to move this slide from one position to the other depending on whether or not the solenoid is electrically powered.

The protection solenoid valve 31 is equipped with a return spring 47 tending continuously to return it to the inactivated position thereof, and the change thereof to the activation position thereof is obtained by supplying it with electrical power in order to move it to the activation position thereof against the spring 47.

As indicated above, the protection valves 33 and 34 are equipped with return springs 36 and 39 which continuously tend to return them to the active positions thereof: it is the pressurisation of the deactivation inlets 38 and 42 thereof which ensures that these valves are inactive in nominal operation.

In the event of a failure of the hydraulic circuit, the activation inlets 37, 41 and the inlet 46 of the amplification valve 32, as well as the deactivation inlets 38, 42 are depressurised. In this case, the return springs 36 and 39 of the protection valves 33 and 34, and the return spring 43 of the amplification valve 32 move these valves to activate them, which has the effect of returning the blades of the propeller to a propulsion orientation in the event of malfunctioning of the hydraulic circuit.

In other words, thanks to the return springs, if the pressures are identical at the two inlets of one or other of the protection valves 33, 34, they are returned by these springs to the activation positions thereof.

Moreover, in the example of FIGS. 4 and 5, the valves 33 and 34 are distinct and independent. However, they may be mechanically connected to one another, for example by means of a rod rigidly securing the slide valves thereof to one another, so as to be controlled by the same activation inlet and the same deactivation inlet common to these two valves.

In general, if a drift in the orientation of the blades towards the thrust reversal orientation thereof is detected, the computer electrically controls the protection solenoid valve to activate it.

This activation has the effect of activating the amplification valve to depressurise the deactivation inlets of the two protection valves and to pressurise the activation inlets thereof, resulting in very rapid activation of the protection valves to return the blades to the propulsion orientation thereof.

In practice, the implementation of the amplification valve makes it possible to obtain a reaction time in the order of one tenth of a second, whereas in a system without an amplification valve, wherein the protection valves are solenoid valves, the activation time is in the order of one second.

The circuit architecture according to the invention makes it possible to provide an amplification valve having a small size including a distributor of small size so that a small flow rate is sufficient to change the position thereof, and having a short stroke, so that this amplification valve can have a mass and a size much smaller than those of the other valves of the circuit.

In the example of the figures, the invention is implemented on a turbojet equipped with variable-pitch fan blades, but it can be implemented in an unshrouded turbo-prop type engine or of the "open rotor" type with a contra-rotating double-propeller.

What is claimed is:

1. A hydraulic control circuit for actuating a double-acting steering actuator for orienting the blades of an aircraft engine pusher propeller, the double-acting actuator comprising a first and a second chamber, the circuit comprising:

a high-pressure line and a low-pressure line;

a distributing valve for connecting the first chamber to the high-pressure line and the second chamber to the low-pressure line or vice versa, or for isolating the two chambers from the high-pressure and low-pressure lines;

a first protection valve being able to assume a deactivated position or an activation position that places the first chamber in communication with the high-pressure line;

a second protection valve being able to assume a deactivated position or an activation position that places the second chamber in communication with the low-pressure line;

the protection valves include an activation hydraulic inlet and a deactivation hydraulic inlet that can be connected to the high-pressure line or to the low-pressure line to place them in the deactivation or activation position;

an amplification valve being able to assume a deactivated position or an activation position that connects the high-pressure line to each activation inlet and the low-pressure line to each deactivation inlet to activate the protection valves;

the amplification valve including a hydraulic control inlet for placing the amplification valve in the activation position when the control inlet is connected to the low-pressure line and for placing the amplification valve in the deactivated position when the control inlet is connected to the high-pressure line;

and a protection solenoid valve being able to assume a deactivation position or an activation position wherein the protection solenoid valve connects the control inlet of the amplification valve to the low-pressure line in order to activate the amplification valve.

2. The hydraulic control circuit according to claim 1, wherein the first and the second protection valve are mechanically coupled and share the same activation hydraulic inlet and the same deactivation hydraulic inlet.

3. The hydraulic control circuit according to claim 2, wherein the first and the second protection valve each include a slide valve, and wherein these two slide valves are connected to one another by a rod.

4. The hydraulic control circuit according to claim 1, wherein each protection valve is equipped with a return spring tending continuously to return the respective protection valve towards the activation position thereof.

5. The hydraulic control circuit according to claim 1, wherein the amplification valve is equipped with a return spring tending continuously to return the amplification valve to the activation position thereof.

6. The hydraulic control circuit according to claim 1, wherein the protection valves prevent fluid flow to the first chamber and the second chamber from the distributing valve when the protection valves are activated.

\* \* \* \* \*